US012745015B2

(12) United States Patent
Kameda et al.

(10) Patent No.: US 12,745,015 B2
(45) Date of Patent: Sep. 22, 2026

(54) IMAGE CAPTURING APPARATUS, METHOD, AND STORAGE MEDIUM FOR REDUCING NOISE IN IMAGES GENERATED FROM A SINGLE EXPOSURE AND APLIFIED WITH DIFFERENT GAINS

(71) Applicant: CANON KABUSHIKI KAISHA, Tokyo (JP)

(72) Inventors: Jun Kameda, Tokyo (JP); Kosuke Matsubara, Tokyo (JP); Toshiyuki Takada, Tokyo (JP); Toshiharu Ueda, Tokyo (JP); Kento Iimori, Tokyo (JP); Yohei Kanda, Kanagawa (JP); Fumihito Karahashi, Kanagawa (JP); Shohei Tozawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 18/782,570

(22) Filed: Jul. 24, 2024

(65) Prior Publication Data

US 2024/0380996 A1 Nov. 14, 2024

Related U.S. Application Data

(63) Continuation of application No. PCT/JP2022/048563, filed on Dec. 28, 2022.

(30) Foreign Application Priority Data

Feb. 25, 2022 (JP) ................................ 2022-028382
Oct. 3, 2022 (JP) ................................ 2022-159717

(51) Int. Cl.
*H04N 25/60* (2023.01)
*H04N 25/51* (2023.01)
*H04N 25/57* (2023.01)

(52) U.S. Cl.
CPC ............ *H04N 25/60* (2023.01); *H04N 25/51* (2023.01); *H04N 25/57* (2023.01)

(58) Field of Classification Search
CPC ...... H04N 25/585; H04N 25/60; H04N 25/57; H04N 25/51; H04N 25/63; H04N 23/60; H04N 23/741
See application file for complete search history.

(56) References Cited

U.S. PATENT DOCUMENTS

2013/0050538 A1* 2/2013 Okubo ..................... G06T 5/70 348/241
2017/0272678 A1* 9/2017 Sakakibara ........... H10F 39/182
(Continued)

FOREIGN PATENT DOCUMENTS

JP 2012080195 A 4/2012
JP 2013046348 A 3/2013
(Continued)

OTHER PUBLICATIONS

Foreign Patent Documents #1 and 3 were cited in the International Search Report dated Mar. 20, 2023, of International Application No. PCT/JP2022/048563, which is enclosed without an English translation.

*Primary Examiner* — Kelly L Jerabek
(74) *Attorney, Agent, or Firm* — Cowan, Liebowitz & Latman, P.C.

(57) ABSTRACT

An image capturing apparatus includes a pixel portion in which a plurality of pixels are arranged, first acquisition unit for amplifying first image signals obtained by exposing the pixel portion, with multiple different gains, and acquiring multiple images respectively amplified with the multiple different gains, second acquisition unit for acquiring images for correction that correspond to the multiple different gains, and correction unit for correcting the multiple images using
(Continued)

the images for correction that correspond to the gains with which the multiple images are respectively amplified.

13 Claims, 6 Drawing Sheets

(56) References Cited

U.S. PATENT DOCUMENTS

| | | | | |
|---|---|---|---|---|
| 2021/0306571 | A1 * | 9/2021 | Yamashita | H04N 25/78 |
| 2023/0113058 | A1 * | 4/2023 | Kim | H04N 23/71 |
| 2023/0131477 | A1 * | 4/2023 | Sato | G06V 10/993 345/629 |
| 2024/0196116 | A1 * | 6/2024 | Miyauchi | H04N 23/667 |

FOREIGN PATENT DOCUMENTS

| | | | |
|---|---|---|---|
| JP | 2015128253 | A | 7/2015 |
| JP | 2017034473 | A | 2/2017 |
| JP | 2020088791 | A | 6/2020 |
| WO | 2016009832 | A1 | 1/2016 |

* cited by examiner

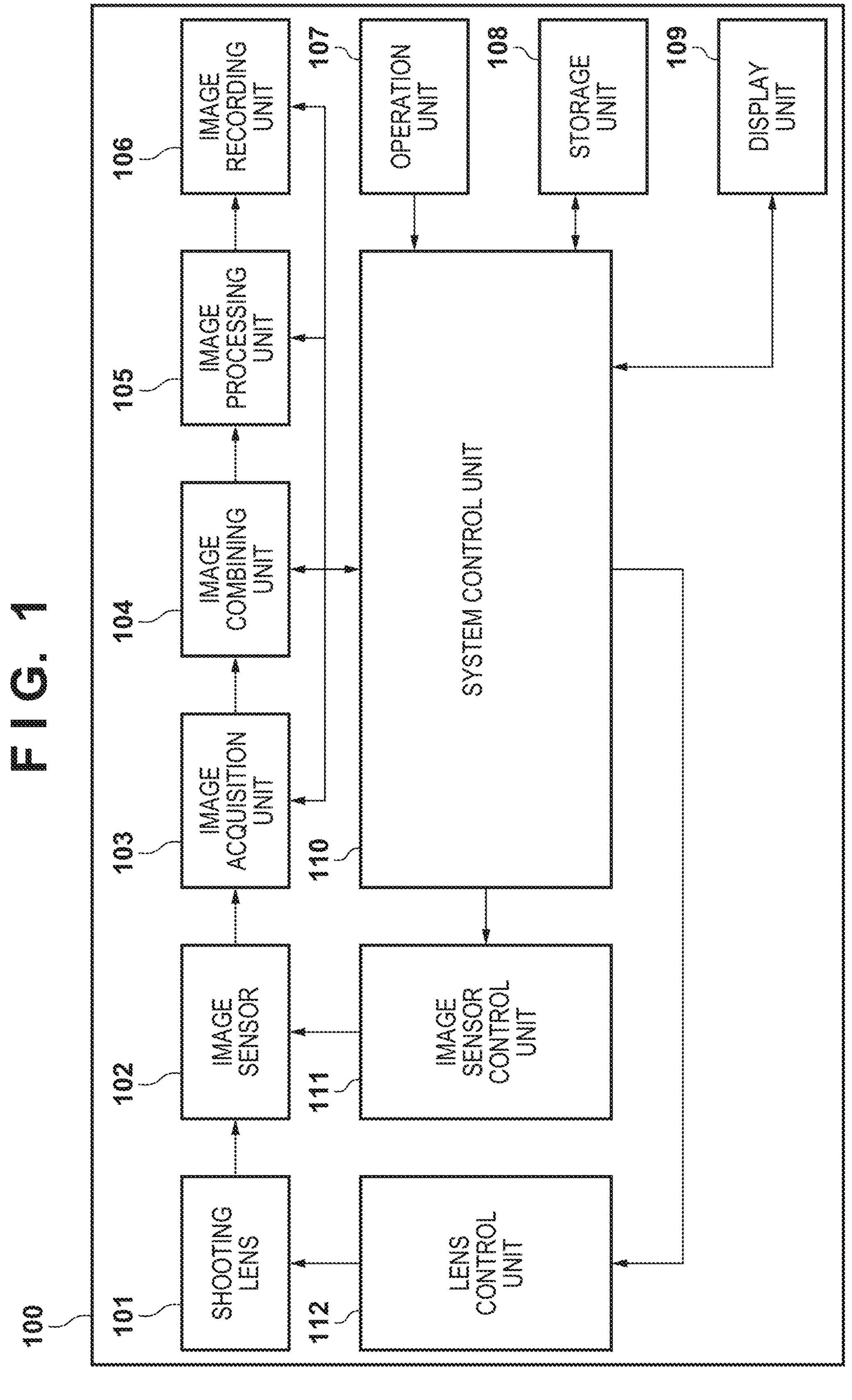
F I G. 1
100
101
SHOOTING LENS
102
IMAGE SENSOR
103
IMAGE ACQUISITION UNIT
104
IMAGE COMBINING UNIT
105
IMAGE PROCESSING UNIT
106
IMAGE RECORDING UNIT
107
OPERATION UNIT
108
STORAGE UNIT
109
DISPLAY UNIT
110
SYSTEM CONTROL UNIT
111
IMAGE SENSOR CONTROL UNIT
112
LENS CONTROL UNIT 208
200
R
201
202
211
G
G
B
R
G
G
B
203
COLUMN CIRCUIT
204
209
COLUMN CIRCUIT
210
COLUMN CIRCUIT
COLUMN CIRCUIT
205
207
206
VERTICAL SCANNING CIRCUIT
HORIZONTAL TRANSFER CIRCUIT

FIG. 6

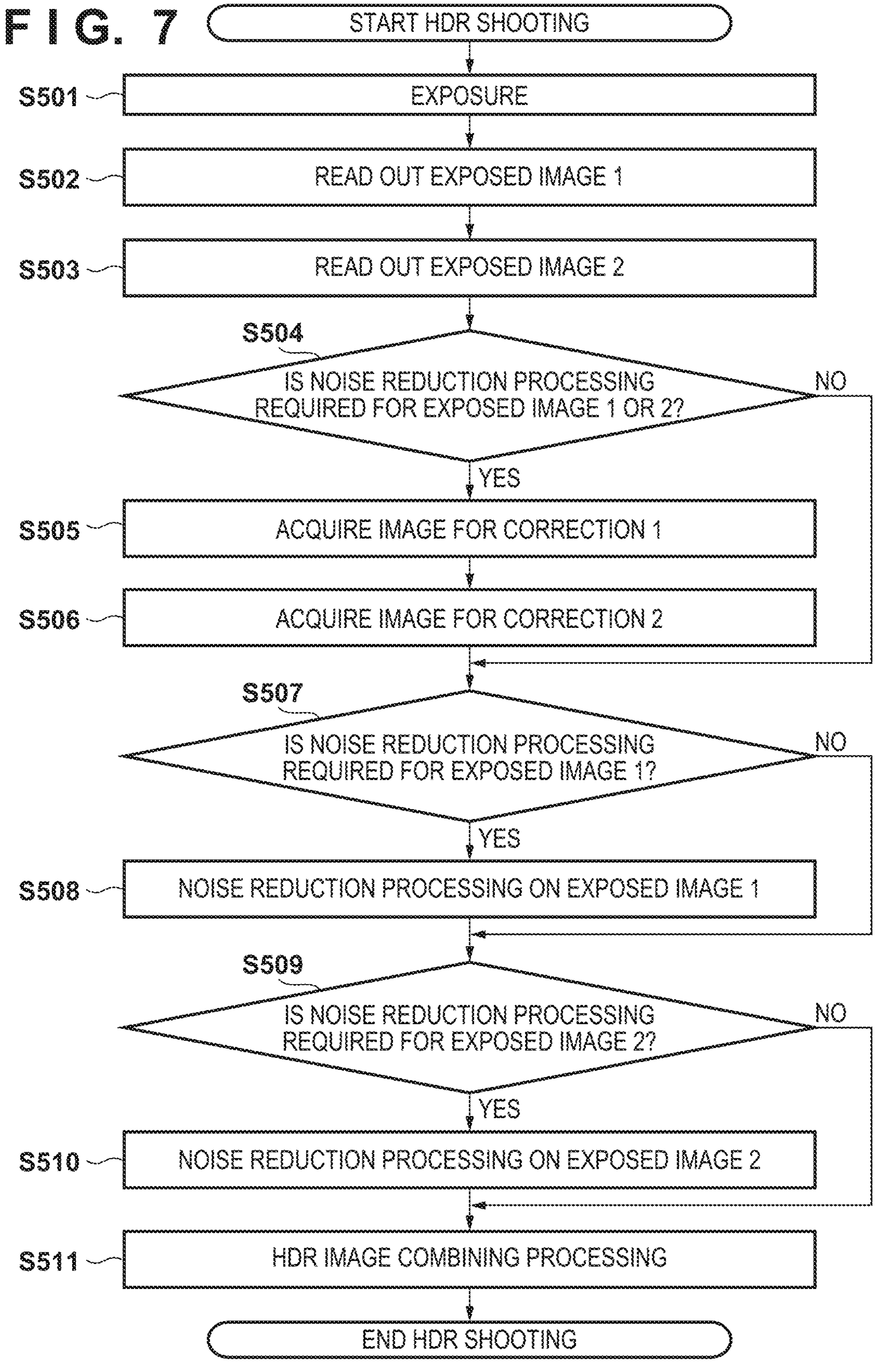
FIG. 7
START HDR SHOOTING
S501
EXPOSURE
S502
READ OUT EXPOSED IMAGE 1
S503
READ OUT EXPOSED IMAGE 2
S504
IS NOISE REDUCTION PROCESSING REQUIRED FOR EXPOSED IMAGE 1 OR 2?
NO
YES
S505
ACQUIRE IMAGE FOR CORRECTION 1
S506
ACQUIRE IMAGE FOR CORRECTION 2
S507
IS NOISE REDUCTION PROCESSING REQUIRED FOR EXPOSED IMAGE 1?
NO
YES
S508
NOISE REDUCTION PROCESSING ON EXPOSED IMAGE 1
S509
IS NOISE REDUCTION PROCESSING REQUIRED FOR EXPOSED IMAGE 2?
NO
YES
S510
NOISE REDUCTION PROCESSING ON EXPOSED IMAGE 2
S511
HDR IMAGE COMBINING PROCESSING
END HDR SHOOTING

IMAGE CAPTURING APPARATUS, METHOD, AND STORAGE MEDIUM FOR REDUCING NOISE IN IMAGES GENERATED FROM A SINGLE EXPOSURE AND APLIFIED WITH DIFFERENT GAINS

CROSS-REFERENCE TO RELATED APPLICATIONS

This application is a Continuation of International Patent Application No. PCT/JP2022/048563, filed Dec. 28, 2022, which claims the benefit of Japanese Patent Application No. 2022-028382, filed Feb. 25, 2022 and Japanese Patent Application No. 2022-159717, filed Oct. 3, 2022, all of which are hereby incorporated by reference herein in their entirety.

BACKGROUND OF THE INVENTION

Field of the Invention

The present invention relates to an image capturing apparatus and a method for controlling the same.

Background Art

In recent years, for image capturing apparatuses, a function, called HDR shooting, in which multiple images with different exposures are shot and combined, has been widely proposed to capture still and moving images with a wider dynamic range than one image shooting.

For example, PTL 1 discloses a technique in which, by simultaneously processing signals of the same pixel with different gains using a plurality of column circuits, a plurality of images with different exposures are simultaneously shot to obtain images to be combined.

CITATION LIST

Patent Literature

PTL 1: Japanese Patent Application Laid-Open No. 2015-128253

However, even when a plurality of images with different exposures are simultaneously shot as described in PTL 1 above, noise such as a dark current will occur if exposure time is long. There is a demand for a method for reducing the noise with accuracy.

The present invention has been made in view of the above-described problem and provides an image capturing apparatus that can reduce noise in multiple images shot simultaneously, with accuracy.

SUMMARY OF THE INVENTION

According to the present invention, there is provided an image capturing apparatus comprising: a pixel portion in which a plurality of pixels are arranged; at least one processor or circuit configured to function as: a first acquisition unit configured to amplify first image signals obtained by exposing the pixel portion, with multiple different gains, and acquiring multiple images respectively amplified with the multiple different gains; a second acquisition unit configured to acquire images for correction that correspond to the multiple different gains; and a correction unit configured to correct the multiple images using the images for correction that correspond to the gains with which the multiple images are respectively amplified.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a block diagram showing a schematic configuration of an image capturing apparatus according to a first embodiment of the present invention.

FIG. 6 is a flowchart showing operations of noise reduction processing when performing HDR shooting according to the first embodiment.

FIG. 7 is a flowchart showing operations of noise reduction processing when performing HDR shooting according to a second embodiment.

DESCRIPTION OF THE EMBODIMENTS

Figure 2:
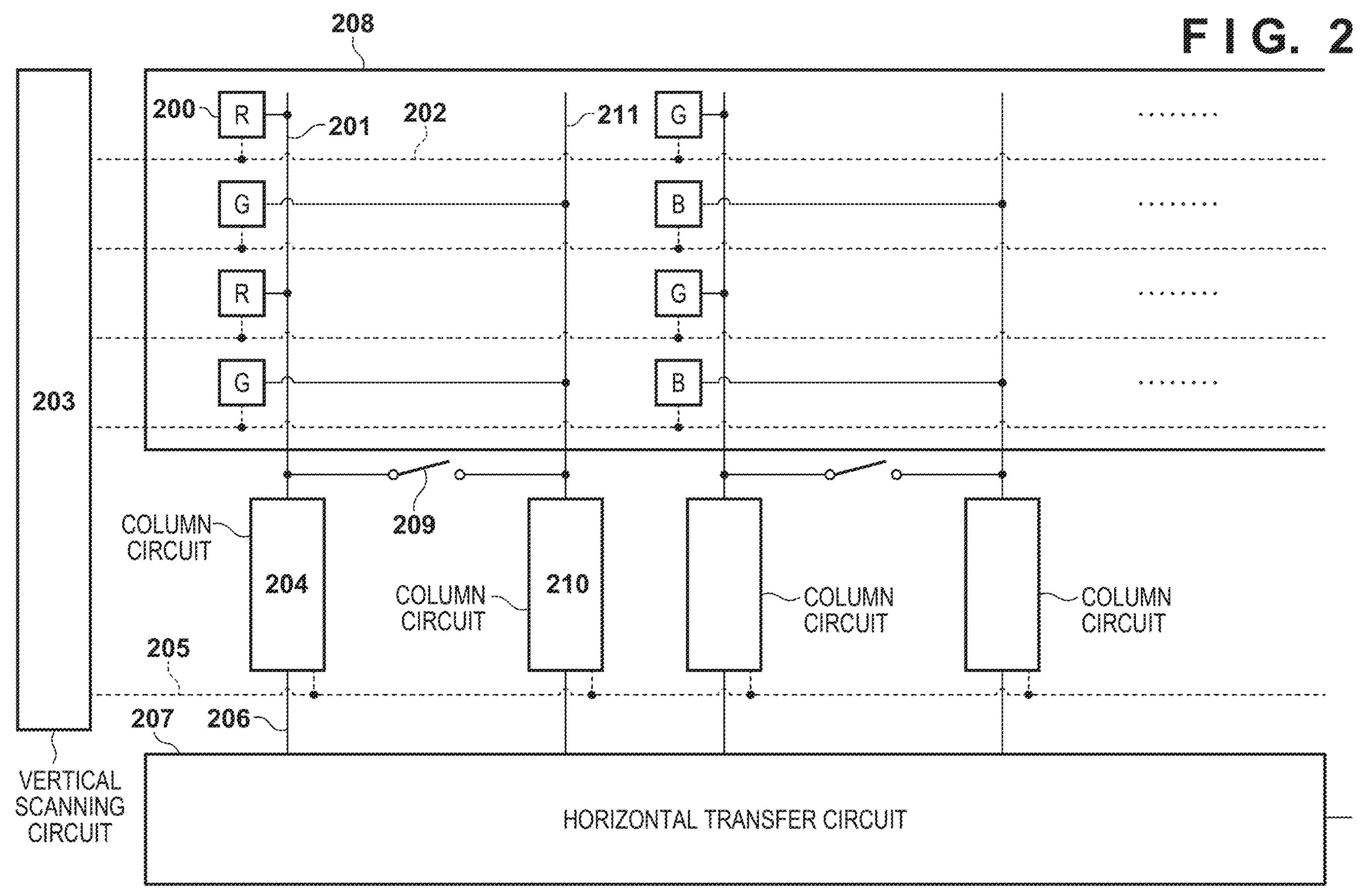
FIG. 2 is a block diagram of an image sensor.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing a schematic configuration of an image capturing apparatus 100, which is a first embodiment of the image capturing apparatus of the present invention.

In FIG. 1, a shooting lens 101 is an interchangeable lens unit that can be attached to the main body of the image capturing apparatus 100, or a lens part built in the main body, and is constituted by multiple lens groups including a focus lens, a zoom lens, and the like, a diaphragm mechanism, and the like.

An image sensor 102 is a CMOS image sensor including a plurality of pixels and can be driven by two driving methods. One method is a driving method in which photoelectric conversion is performed on each of the pixels for an optical image of a subject formed by the shooting lens 101 to generate a charge based on the amount of incident light, and image signals obtained by amplifying signals of the pixels with the same gain are output. The other method is a driving method in which a plurality of image signals obtained by amplifying signals of the pixels with multiple types of gains are output.

Also, the image sensor 102 has an electronic shutter function to adjust the amount of light incident on each pixel, such as a rolling shutter, and can control the exposure time. Also, a physical curtain mechanism is provided to completely block incident light.

An image acquisition unit 103 acquires image signals output from the image sensor 102, temporarily holds the acquired image signals, and performs photometry using the acquired image signals.

An image combining unit 104 generates, using a suitable combining method, a high dynamic range (HDR) image from the image signals that are based on the output of the image sensor 102 and temporarily held in the image acquisition unit 103. For example, there is a method in which image signals with a high amount of gain are used for an image portion having a predetermined signal level or less, and image signals with a low amount of gain are used for an image portion (bright and white-out image) having a signal level exceeding the predetermined level, and these image signals are combined. Note that in a normal image for use in a signal in a dark portion of the combined image, random noise in the dark portion is preferably suppressed. Also, when no HDR shooting is performed, the image signals held in the image acquisition unit 103 are directly output.

An image processing unit 105 performs various types of signal processing such as noise reduction processing, gamma processing, color signal processing, and exposure compensation processing on the image signals held in the image acquisition unit 103 or the image signals output from the image combining unit 104, and outputs the processed image signals.

An image recording unit 106 records the image signals processed by the image processing unit 105 in a storage device or a storage medium. For example, a memory device attachable to the main body of the image capturing apparatus 100 is used as the storage device or the storage medium.

By operating an operation unit 107, a user can input various instructions to the image capturing apparatus 100. The operation unit 107 includes operation members such as a release button, a mode switching dial, and a zoom operation lever, and a touch panel. A user input via the operation unit 107 is given to a system control unit 110. A flowchart of HDR shooting settings in which the user operates the operation unit 107 to input HDR shooting settings to the image capturing apparatus 100 will be described later after the description with reference to the block diagram in FIG. 1 is complete.

A storage unit 108 is a storage unit that stores content of user instructions given to the image capturing apparatus 100 and is constituted by a non-volatile memory that is electrically erasable and recordable. The storage unit 108 also stores a program that is used by the system control unit 110 to control the entire image capturing apparatus 100.

A display unit 109 can display a shot image and information thereof at the time of shooting, a user interface for operation using the operation unit 107, and the like, and is constituted by a TFT-LCD, for example. The display unit 109 may also be constituted by a touch panel and a user input that can be given through an operation via the operation unit 107 can also be input on the display unit 109. Alternatively, the display unit 109 may also be constituted by an electronic viewfinder (EVF) having a line-of-sight input function, so that a user input that can be given through an operation via the operation unit 107 can be input on the display unit 109.

A system control unit 110 controls an image sensor control unit 111 and a lens control unit 112, based on image signals and photometric results held in the image acquisition unit 103 and user inputs given through the operation unit 107.

The image sensor control unit 111 performs driving control on the image sensor 102 in accordance with a control signal from the system control unit 110. The lens control unit 112 performs driving control on the shooting lens 101 in accordance with a control signal from the system control unit 111.

FIG. 2 is a block diagram showing a configuration of the image sensor 102 of the present embodiment.

A pixel area (pixel portion) 208 is configured such that a plurality of unit pixels 200 are arranged in a matrix. For ease of description, the present embodiment shows a configuration in which n pixels are arranged in the horizontal direction and 4 pixels are arranged in the vertical direction, but typically, the matrix has a configuration in which multiple pixels are arranged in both the horizontal and vertical directions.

Each of the unit pixels 200 is provided with a color filter of one of a plurality of colors, and a video signal according to the color of the color filter is acquired. In FIG. 2, "RGB" are denoted for pixels, namely, R pixels are provided with red color filters, G pixels are provided with green color filters, and B pixels are provided with blue color filters. In this way, pixels each provided with a color filter of one of the three color are arranged according to Bayer layout.

Drive pulses are transmitted from a vertical scanning circuit 203 to pixels in each row through a corresponding common drive signal line 202. Note that, for ease of description, one drive signal line 202 is shown for each row, but a plurality of drive signal lines may also be provided for each row.

Of unit pixels 200 in the same column, pixels in odd-numbered rows are connected to a column output line 201. Also, pixels in even-numbered rows are connected to a column output line 211. When a switch 209 is OFF, image signals from the odd-numbered rows are input only to a column circuit 204 via the column output line 201. When the switch 209 is ON, the image signals from the odd-numbered rows are input to both the column circuit 204 and the column circuit 210.

The same applies to the pixels in the even-numbered rows, and when the switch 209 is OFF, the image signals are input only to the column circuit 210 via the column output line 211. When the switch 209 is ON, the image signals from the even-numbered rows are input to both the column circuit 204 and the column circuit 210.

When the switch 209 is OFF, the even-numbered rows and the odd-numbered rows can be read out simultaneously, and when the switch 209 is ON, the even-numbered rows and the odd-numbered rows are read out sequentially. Accordingly, when the switch 209 is turned from OFF to ON, it takes long time until the read out is complete. In the present embodiment, when performing one image shooting, the switch 209 is used while being in the OFF state, and when acquiring two images for HDR shooting, the switch 209 is used while being in the ON state.

The column circuit 204 and the column circuit 210 are connected to the vertical scanning circuit 203 via a column circuit signal line 205 and perform processing for applying a gain to a signal from each pixel in accordance with an instruction from the image sensor control unit 111. When the switch 209 is OFF, the same gain is set for the column circuit 204 and the column circuit 210. On the other hand, when the switch 209 is ON, different gains are set for the column circuit 204 and the column circuit 210.

In the present embodiment, when performing one image shooting, control is performed such that the switch 209 is turned OFF and the same gain is set for the column circuit 204 and the column circuit 210, so that output signals amplified with the same gain for the even-numbered rows and the odd-numbered rows are obtained. Also, when performing HDR shooting, control is performed such that the switch 209 is turned ON and different gains required for HDR shooting are set for the column circuit 204 and the column circuit 210, so that output signals amplified with the different gains for the even-numbered rows and the odd-numbered rows are obtained. Note that the column circuit 204 and the column circuit 210 also perform A/D conversion processing on pixel signals input to the respective column circuits.

The signals processed in the column circuit 204 and the column circuit 210 are output to a horizontal transfer circuit 207. The horizontal transfer circuit 207 outputs the image signals to the image acquisition unit 103.

Figure 3:
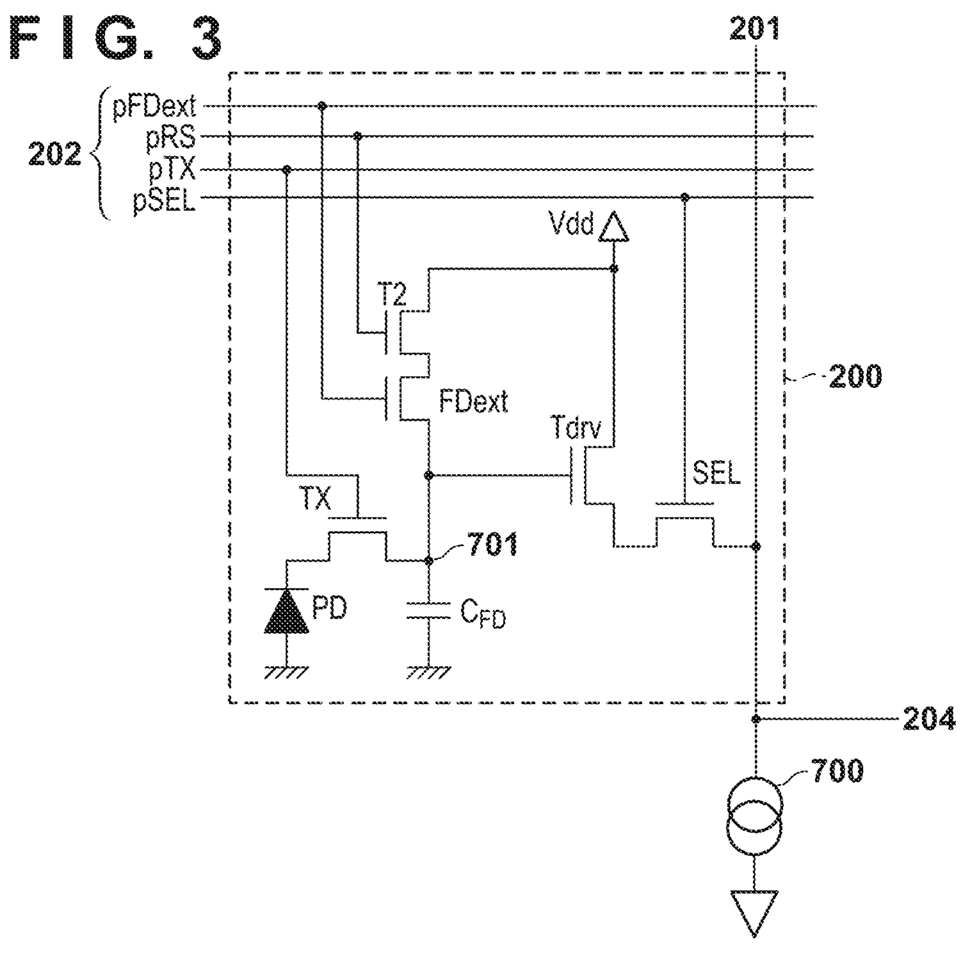
FIG. 3 is a diagram showing a circuit configuration of each unit pixel of the image sensor.

FIG. 3 is a diagram showing a circuit configuration of each unit pixel 200 of the image sensor 102. In FIG. 3, one of the multiple unit pixels 200 constituting the pixel area 208 is representatively shown in a dotted rectangle.

The column output line 201 is connected to a current source 700 and the column circuit 204 and also connected to a plurality of unit pixels 200 arranged in the same column (vertical line of pixels), so as to transmit pixel signals.

The drive signal line 202 is connected to the vertical scanning circuit 203 shown in FIG. 2, and also connected to a plurality of unit pixels 200 arranged in the same row (horizontal line of pixels).

As a result of the vertical scanning circuit 203 controls the unit pixels 200 in the same row to be simultaneously driven via the drive signal line 202, rear-out of signals from the unit pixels 200 and reset thereof are executed. Each of the drive signal lines 202 includes a transfer control line pTX, an FD expansion control line pFDext, a reset control line pRS, and a selection control line pSEL, which will be described later.

A photoelectric conversion element (photoelectric conversion portion) PD is a photodiode that converts incident light into a charge and accumulates the converted charge. In the photoelectric conversion element PD, the P side of the PN junction is grounded and the N side of the PN junction is connected to the source of a transfer transistor (transfer switch) TX.

The gate of the transfer transistor TX is connected to the transfer control line pTX, and the drain of the transfer transistor TX is connected to a floating diffusion (FD) capacitance CFD. The transfer transistor TX transfers the charge from the photoelectric conversion element PD to the FD capacitance CFD.

One side of the FD capacitance CFD (charge-voltage conversion portion) is grounded and accumulates the charge transferred from the photoelectric conversion element PD while converting the charge into a voltage. Hereinafter, the connection point between the drain of the transfer transistor TX and the other side (non-grounded side) of the FD capacitance CFD is referred to as an FD node 701.

An FD expansion transistor (FD expansion portion) FDext is a MOS transistor whose gate is connected to the FD expansion control line pFDext, whose source is connected to the FD capacitance CFD, and whose drain is connected to a reset transistor (reset switch) T2.

The gate of the reset transistor T2 is connected to the reset control line pRS, the drain of the reset transistor T2 is connected to a power supply voltage Vdd, and the source of the reset transistor T2 is connected to the FD expansion transistor FDext.

When the FD expansion transistor FDext and the reset transistor T2 are set to an ON state, the potential of the FD node 701 is reset to the power supply voltage Vdd. On the other hand, when both the FD expansion transistor FDext and the reset transistor T2 are in an OFF state, the charge transferred from the photoelectric conversion element PD is converted into a voltage by the FD capacitance CFD.

When the FD expansion transistor FDext is in the ON state and the reset transistor T2 is in the OFF state, the FD expansion transistor FDext functions as an accumulation portion (that is, accumulation capacitance) capable of accumulating the charge. The accumulation capacitance is hereinafter referred to as a "FD expansion capacitance Cex".

In this case, because the accumulation capacitance of the FD expansion transistor FDext and the FD capacitance CFD are grounded parallel to the substrate, the capacitance viewed from the FD node 701 is a capacitance CFDadd obtained by adding the FD expansion capacitance Cex to the FD capacitance CFD.

Accordingly, at the FD node 701, the charge transferred from the photoelectric conversion element PD is converted into a voltage using the summed capacitance CFDadd, which is the sum of the FD capacitance CFD and the FD expansion capacitance Cex.

The driving transistor (amplification portion) Tdrv is a transistor that constitutes an in-pixel amplifier, and has a gate connected to the FD capacitance CFD, a drain connected to the power supply voltage Vdd, and a source connected to a selection transistor SEL. Accordingly, the driving transistor Tdrv outputs a voltage that corresponds to the accumulated charge of the FD capacitance CFD.

The gate of the selection transistor SEL is connected to the selection control line pSEL, and the source of the selection transistor SEL is connected to the column output line 201. The selection transistor SEL outputs, to the column output line 201, an output of the driving transistor Tdrv as an output signal (pixel signal) of the unit pixel 200.

The current source 700 constitutes, together with the driving transistor Tdrv for driving the unit pixels 200 in the column to which the column output line 201 is connected, a source follower circuit, which functions as the in-pixel amplifier.

In the present embodiment, transistors other than the driving transistor Tdrv and the current source 700 function as switches, and are configured to conduct a current (be turned ON) when a signal on the control line connected to their gate is High and interrupt a current (be turned OFF) when the signal is Low.

Figure 4:
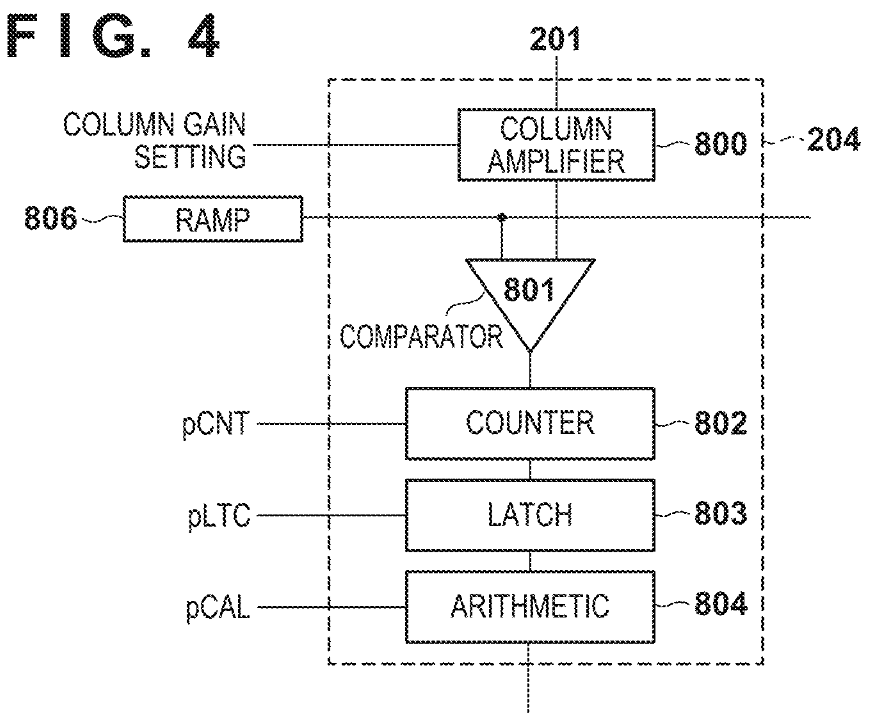
FIG. 4 is a circuit diagram showing a circuit configuration of a column circuit.

FIG. 4 is a circuit diagram showing a circuit configuration of the column circuit 204. Since the column circuit 210 has the same circuit configuration as that of the column circuit 204, the following will describe the configuration of the column circuit 204, as a representative example.

The column circuit 204 includes a column amplifier 800, a comparator 801, a counter circuit 802, a latch circuit 803, and an arithmetic circuit 804. A ramp signal generating portion 806 (hereinafter, referred to as "RAMP") is a circuit that generates a ramp signal varying with respect to time. The column amplifier 800 is an amplifier that amplifies an output signal (pixel signal) of a unit pixel 200 output to the column output line 201.

The comparator 801 compares the ramp signal generated by the ramp signal generating portion 806 with an output of the column amplifier 800, and outputs an inversion signal at a timing at which the ramp signal varying with respect to time matches the pixel output.

The counter circuit 802 performs counting operation based on clocks supplied from a connected counter control line pCNT. The counter circuit 802 starts the counting operation at a timing at which the comparator 801 starts comparing the pixel signal with the ramp signal, and outputs a count value at a timing at which the output of the comparator 801 is inverted.

The latch circuit 803 temporarily holds the count value output by the counter circuit 802 and outputs the held count value based on control via a connected latch control line pLTC.

The arithmetic circuit 804 stores the count value output by the latch circuit 803 as a digital signal of the pixel, based on control via a connected arithmetic control line pCAL. In addition, the arithmetic circuit 804 outputs the stored digital signal of the pixel. The comparator 801, the counter circuit 802, the latch circuit 803, the arithmetic circuit 804, and the RAMP 806 constitute an A/D converter.

The following will describe gain settings in the column circuit 204. The same applies to the column circuit 210. The column amplifier 800 of the column circuit 204 can amplify output signals (pixel signals) of the unit pixels 200 output to the column output line 201, with multiple different gains. The column amplifier 800 amplifies the pixel signals with gains set in a later-described manner, and the amplified pixel signals are input to the comparator 801.

Note that pixel signals may be amplified with different gains at the time of A/D conversion by not only the column amplifier 800 but also a downstream A/D converter changing the time change of a ramp signal. In other words, if time change of a ramp signal is slow, inversion of the output of comparator 801 will be delayed, resulting in an increase in the count value. Since the speed of time change of a ramp signal corresponds to the amplification rate of an output signal of a unit pixel 200, this is referred to as a RAMP gain, and the RAMP gain can be switched by changing the level of time change.

Figure 5:
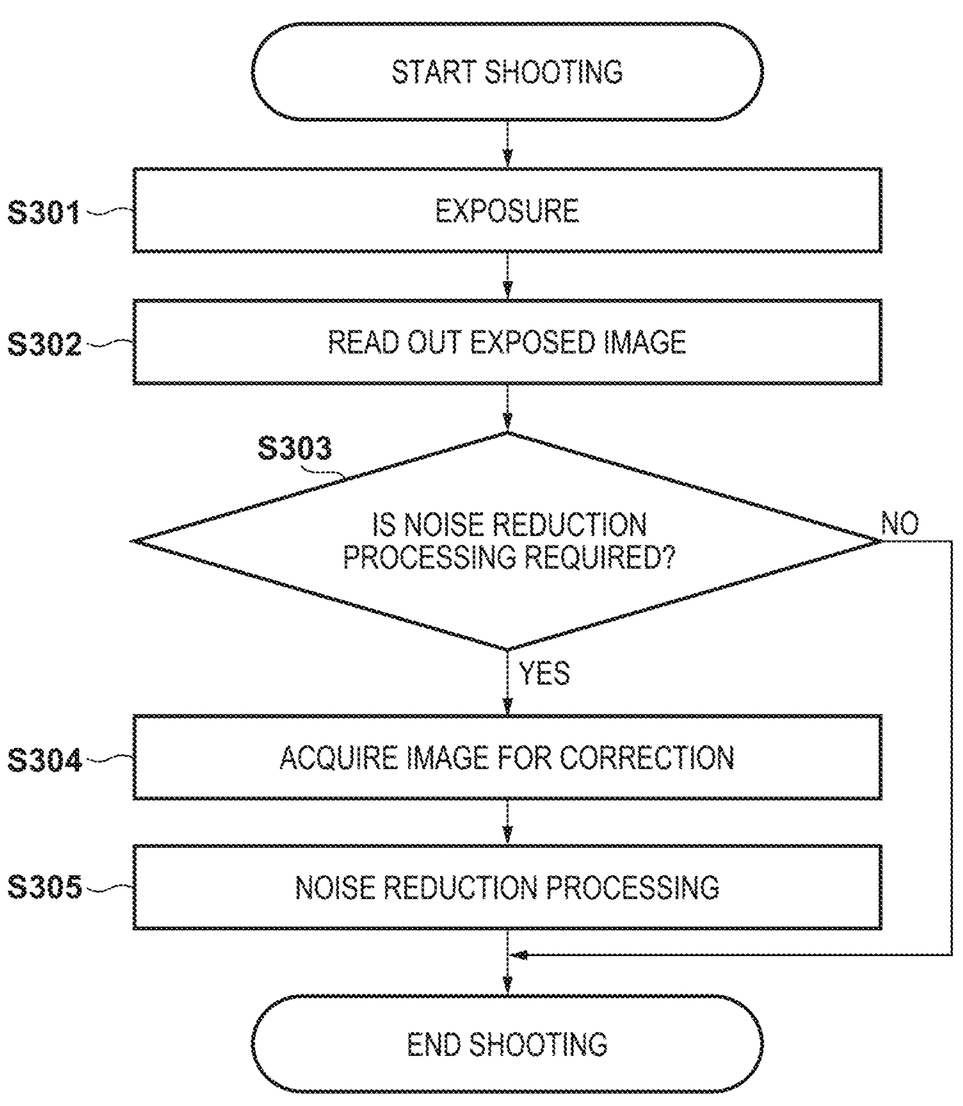
FIG. 5 is a flowchart showing operations of noise reduction processing in one image shooting.

FIG. 5 is a flowchart showing operations of noise reduction processing in one image shooting performed by the image capturing apparatus 100. Shooting is started in response to a shooting request from the operation unit 107. The operations in the flowchart are realized by the system control unit 110 executing a program stored in the storage unit 108.

In step S301, the system control unit 110 performs exposure control on the image sensor 102. Specifically, the system control unit 110 controls the diaphragm mechanism of the shooting lens 101 via the lens control unit 112 and adjusts the amount of light. Also, the system control unit 110 controls an electronic shutter mechanism of the image sensor 102 via the image sensor control unit 111 so that the image sensor 102 generates a required charge. To control the exposure time, exposure time settings stored in the storage unit 108 are used in response to, for example, a designation through the operation unit 107.

In step S302, the system control unit 110 performs control through the image sensor control unit 111 so that the image sensor 102 is driven to output image signals obtained by applying the same gain to the output signals from pixels. To control the amount of gain, gain settings stored in the storage unit 108 are used in response to, for example, a designation through the operation unit 107. The output images are held by the image acquisition unit 103.

In step S303, the system control unit 110 determines whether or not noise reduction processing is required for the image signals temporarily stored in the image acquisition unit 103. As to whether or not noise reduction processing is required, determination is YES if the shooting exposure time settings stored in the storage unit 108 indicate predetermined time or longer, and determination is NO if the shooting exposure time settings indicate time less than the predetermined time. In addition, the determination method may be changed according to the purpose, and an example of the method may include a method in which the noise level of an image temporarily stored in the image acquisition unit 103 is detected by the image processing unit 105 and the determination is made based on the result of the detection.

In step S304, the system control unit 110 reads out an image for correction required for noise reduction processing. Specifically, the system control unit 110 closes the physical curtain of the image sensor 102 through the image sensor control unit 111 to block incident light from the shooting lens 101 (perform light shielding). Then, the system control unit 110 acquires a non-exposed image from the image sensor 102, based on the exposure time settings used in step S301 and the gain settings used in step S302, the two types of settings being stored in the storage unit 108.

As a method for acquiring an image for correction, in addition to the above-described method of acquiring an image for correction by shooting a non-exposed image, a method is also conceivable in which instead of charge transfer from a unit pixel 200 of the image sensor 102, a read-out operation from the downstream column circuit 204 is repeated to read out an image corresponding to a non-exposed image. Also, a method is conceivable in which an image stored in advance in the storage unit 108 is read out and is expanded in the image acquisition unit 103.

In step S305, the system control unit 110 performs noise reduction processing with the image processing unit 105, using the exposed image temporarily stored in the image acquisition unit 103 in step S302 and the image for correction temporarily stored in the image acquisition unit 103 in step S304 as inputs. Examples of the noise reduction processing include a method in which noise content is removed from the exposed image by subtracting the image for correction from the exposed image.

The exposed image subjected to the noise reduction processing is stored in the image recording unit 106, after, if necessary, image processing for visualization is performed on the exposed image by the image processing unit 105, for example.

In one image shooting, noise reduction processing is performed in the above-described manner.

The following will describe a method for controlling noise reduction processing in HDR shooting according to the present embodiment.

Figure 6:
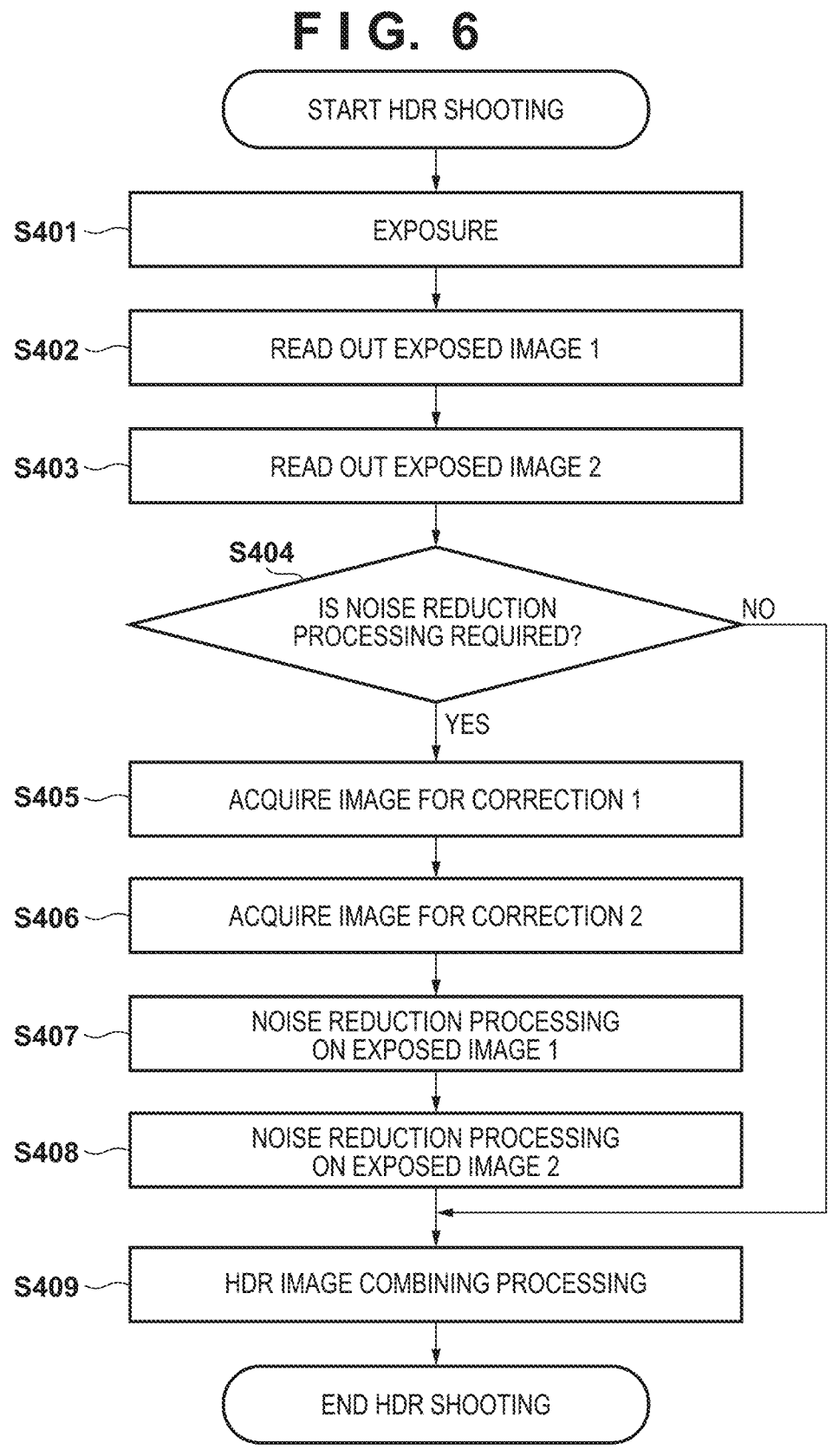

FIG. 6 is a flowchart showing operations of the noise reduction processing when performing HDR shooting in the image capturing apparatus 100. Shooting is started in response to a shooting request from the operation unit 107. The operations in the flowchart are realized by the system control unit 110 executing a program stored in the storage unit 108.

In step S401, the system control unit 110 performs the same processing as in step S301 to perform exposure control on the image sensor 102.

In steps S402 and S403, the system control unit 110 performs control through the image sensor control unit 111 so that the image sensor 102 is driven to output image signals obtained by amplifying multiple different gains to the output signals obtained from pixels at one exposure (single exposure).

In step S402, an exposed image 1 to which a first gain is applied is read out, and in step S403, an exposed image 2 to which a second gain is applied is read out. To control the amounts of gains (the first gain and the second gain) for the respective exposed image 1 and exposed image 2, the gain settings stored in the storage unit 108 are used in response to, for example, a designation through the operation unit 107, or the like.

The image signal of the exposed image 1 is amplified with the first gain in the column circuit 204, and the image signal of the exposed image 2 is amplified with the second gain in the column circuit 210, and then the image signals are transferred to the horizontal transfer circuit 207.

In the present embodiment, a case where image signals with two patterns of gain settings are held is taken as an example. Step S402 is ended at a timing at which the exposed image 1 is temporarily stored in the image acquisition unit 103, and step S403 is ended at a timing at which the exposed image 2 is temporarily stored in the image acquisition unit 103.

In step S404, the system control unit 110 determines whether or not noise reduction processing is required for the image signals temporarily stored in the image acquisition unit 103 in the same manner as in step S303.

In steps S405 and S406, the system control unit 110 reads out images for correction required for noise reduction processing. Specifically, the system control unit 110 closes the physical curtain of the image sensor 102 through the image sensor control unit 111 to block incident light from the shooting lens 101. The system control unit 110 performs control through the image sensor control unit 111 so that the image sensor 102 is driven to output image signals obtained by applying multiple different gains to the output signals obtained from pixels at one accumulation.

In step S405, the system control unit 110 acquires an image for correction 1 with the same exposure time settings (exposure settings) and gain settings stored in the storage unit 108 as those used in the reading in step S402. The acquired image for correction 1 is temporarily stored in the image acquisition unit 103.

In step S406, the system control unit 110 acquires an image for correction 2 with the same exposure time settings and gain settings stored in the storage unit 108 as those used in the reading in step S403. The acquired image for correction 2 is temporarily stored in the image acquisition unit 103.

In step S407, the system control unit 110 performs noise reduction processing using the image processing unit 105, based on the exposed image 1 temporarily stored in the image acquisition unit 103 in step S402, and the image for correction 1 temporarily stored in the image acquisition unit 103 in step S405 serving as inputs. As the noise reduction processing, the same method as that described with reference to step S305 is used. The exposed image 1 subjected to the noise reduction processing is temporarily stored in the image acquisition unit 103.

In step S408, the system control unit 110 performs noise reduction processing using the image processing unit 105, based on the exposed image 2 temporarily stored in the image acquisition unit 103 in step S403 and the image for correction 2 temporarily stored in the image acquisition unit 103 in step S406. As the noise reduction processing, the same method as that described with reference to step S305 is used. The exposed image 2 subjected to the noise reduction processing is temporarily stored in the image acquisition unit 103.

In step S409, the system control unit 110 performs HDR image combining processing using the image combining unit 104 in the above-described manner, based on two images serving as inputs, namely, the exposed image 1 subjected to the noise reduction processing and temporarily stored in the image acquisition unit 103 in step S407, and the exposed image 2 subjected to the noise reduction processing and temporarily stored in the image acquisition unit 103 in step S408. Then, a single HDR image is output.

The HDR image subjected to the combining processing is stored in a storage device or storage medium by the image recording unit 106, after, if necessary, image processing for visualization is performed on the HDR image by the image processing unit 105, for example.

In the HDR shooting in the first embodiment, noise reduction processing is performed on each of the exposed images having different gains as described above, and the exposed images subjected to the noise reduction processing are combined, thereby obtaining a noise-reduced HDR image.

Note that although the present embodiment has described a configuration in which an image for correction corresponding to each gain is read out from the image sensor, the present invention is not limited to this. For example, a configuration is also possible in which only the image for correction 1 is read out from the image sensor and the image for correction 2 is calculated from the image for correction 1 based on the gain ratio of the two exposed images.

Second Embodiment

The following will describe control of the noise reduction processing in HDR shooting, according to a second embodiment of the present invention. Note that, in the present embodiment, the configuration of the image capturing apparatus is the same as that of the image capturing apparatus 100 in the first embodiment.

FIG. 7 is a flowchart showing operations of noise reduction processing when performing HDR shooting by the image capturing apparatus 100. Shooting is started in response to a shooting request from the operation unit 107. The operations in the flowchart are realized by the system control unit 110 executing a program stored in the storage unit 108.

In step S501, the system control unit 110 performs the same processing as in step S301 to perform exposure control on the image sensor 102.

In steps S502 and S503, the system control unit 110 performs control through the image sensor control unit 111 so that the image sensor 102 is driven to output image signals obtained by applying multiple different gains to the output signals obtained from pixels at one exposure (single exposure).

In step S502, an exposed image 1 to which a first gain is applied is read out, and in step S503, an exposed image 2 to which a second gain is applied is read out. To control the amounts of gains (the first gain and the second gain) the respective exposed image 1 and exposed image 2, the gain settings stored in the storage unit 108 are used t in response to, for example, a designation through the operation unit 107, or the like.

The image signal of the exposed image 1 is amplified with the first gain in the column circuit 204, and the image signal of the exposed image 2 is amplified by the second gain in the column circuit 210, and then the image signals are transferred to the horizontal transfer circuit 207.

In the present embodiment, a case in which image signals with two patterns of gain settings are held is taken as an example. Step S502 is ended at a timing at which the exposed image 1 is temporarily stored in the image acquisition unit 103, and step S503 is ended at a timing at which the exposed image 2 is temporarily stored in the image acquisition unit 103.

In step S504, the system control unit 110 determines whether or not noise reduction processing is required for the image signal temporarily stored in the image acquisition unit 103. Specifically, the system control unit 110 determines whether or not noise reduction processing is required for any one of the exposed image 1 and the exposed image 2, with reference to the exposure time settings and the two patterns of gain settings stored in the storage unit 108.

In the present embodiment, a higher gain setting is used for the exposed image 2 than for the exposed image 1 for HDR shooting in order to create an exposure difference. If an image is amplified with a lower amount of gain and is read out even at the same exposure time, noise components in the image are not emphasized, and thus noise is less noticeable. Accordingly, it is determined whether or not noise reduction is required, using, as thresholds, the exposure time settings used in step S501 and the gain settings used in steps S502 and S503, the settings being stored in the storage unit 108.

The following will describe an example of the determination as to whether or not noise reduction is required. For example, if the exposure time setting for the unit pixel 200 is 1 second or longer, it is determined that noise reduction processing is required for both the exposed image 1 and the exposed image 2. Even if the exposure time is less than 1 second, it is determined that noise reduction processing is required for the exposed image with a gain setting of ISO sensitivity 6400 or higher if the column circuit 204 and the column circuit 210 have a possible gain setting ranges of ISO 100 to 12800.

Note however that, needless to say, the threshold setting method and determination method described herein are not limited to these methods, and other methods may also be used. Also, in addition to the methods described above, it is also conceivable to perform noise detection processing on the image signal temporarily stored in the image acquisition unit 103 in the same manner as in step S303, and determine whether or not noise reduction processing is required.

In the present embodiment, it is determined, for example, that noise reduction processing is not required for the exposed image 1, and noise reduction processing is required for the exposed image 2, and the procedure moves to step S505. The determination result in step S504 is stored in the storage unit 108. Note that if, in step S504, no noise reduction processing is required for both the exposed image 1 and the exposed image 2, the procedure moves to step S507.

In steps S505 and S506, the system control unit 110 reads out images for correction required for the noise reduction processing. Specifically, the system control unit 110 closes the physical curtain of the image sensor 102 through the image sensor control unit 111 to block incident light from the shooting lens 101. The system control unit 110 performs control through the image sensor control unit 111 so that the image sensor 102 is driven to output image signals obtained by applying multiple different gains to the output signals obtained from pixels at one accumulation.

In step S505, the system control unit 110 acquires an image for correction 1 with the same exposure time settings and gain settings stored in the storage unit 108 as those used in the reading in step S502. The acquired image for correction 1 is temporarily stored in the image acquisition unit 103. Note that in the present embodiment, since it is determined in step S504 that no noise reduction processing is required for the exposed image 1, the image for correction 1 does not need to be stored in the image acquisition unit 103.

In step S506, the system control unit 110 acquires an image for correction 2 with the same exposure time settings and gain settings stored in the storage unit 108 as those used in reading in step S503. The acquired image for correction 2 is temporarily stored in the image acquisition unit 103.

In step S507, the system control unit 110 determines whether or not to perform noise reduction in step S508, with reference to the result of the determination as to whether or not noise reduction processing is required for the exposed image 1, the determination result being obtained in step S504 and stored in the storage unit 108. In the present embodiment, since it is determined that no noise reduction processing is required as described above, the procedure moves to step S509.

In step S508, the system control unit 110 performs noise reduction processing using the image processing unit 105, based on the exposed image 1 temporarily stored in the image acquisition unit 103 in step S502 and the image for correction 1 temporarily stored in the image acquisition unit 103 in step S505, serving as inputs.

As the noise reduction processing, the same method as that described with reference to step S305 is used. The exposed image 1 subjected to the noise reduction processing is temporarily stored in the image acquisition unit 103. Note that in the present embodiment, an example is given where step S508 is omitted, and thus the processing in this step is not executed.

In step S509, the system control unit 110 determines whether or not to perform noise reduction processing in step S510, with reference to the determination result as to whether or not noise reduction processing is required for the exposed image 2, the determination result being obtained in step S504 and stored in the storage unit 108. In the present embodiment, since it is determined that noise reduction processing is required as described above, the procedure moves to step S510.

In step S510, the system control unit 110 performs noise reduction processing using the image processing unit 105, based on the exposed image 2 temporarily stored in the image acquisition unit 103 in step S503 and image for correction 2 temporarily stored in the image acquisition unit 103 in step S506, serving as inputs. As the noise reduction processing, the same method as that described with reference to step S305 is used. The exposed image 2 subjected to the noise reduction processing is temporarily stored in the image acquisition unit 103.

In step S511, the system control unit 110 performs HDR image combining processing using the image combining unit 104, based on the exposed image 1 and the exposed image 2 serving as inputs, and outputs a single HDR image, in the above-described manner. In the present embodiment, the HDR image combining processing is performed using two images, namely, the exposed image 1 temporarily stored in the image acquisition unit 103 in step S502 and has not been subjected to noise reduction processing, and the exposed image 2 temporarily stored in the image acquisition unit 103 in step S510 and has been subjected to noise reduction processing.

Note that if, in step S504, it is determined that no noise reduction processing is required for both the exposed image 1 and the exposed image 2, the HDR image combining processing is performed using two images, namely, the exposed image 1 temporarily stored in the image acquisition unit 103 in step S502 and has not been subjected to noise reduction processing, and the exposed image 2 temporarily stored in the image acquisition unit 103 in step S503 and has not been subjected to noise reduction processing.

As described above, in the HDR shooting according to the second embodiment, it is determined whether or not noise reduction processing is required for each of the exposed images of different gains, and if noise reduction processing is required, the exposed images subjected to noise reduction processing, or images one of which has been subjected to noise reduction processing are combined. Accordingly, it is possible to obtain an HDR image in which noise reduction processing is applied only to the necessary portion of the image. HDR combining is performed based on images in which noise reduction processing is applied only to an area of the images shot in a manner such that noise is noticeable, such as an area having long exposure time (seconds) or high gain amount settings, and thus it is possible to obtain a favorable HDR image.

Note that the first and second embodiments have described examples in which when performing HDR shooting, the gains of the column amplifiers 800 of the column circuit 204 and the column circuit 210 have a gain difference, but the gains of the RAMPs 806 may have a gain difference. Also, pixel signals having a gain difference obtained by setting different FD capacitances of the pixels may be read out.

The disclosure of the present specification includes the following image capturing apparatus, method, program, and storage medium.

(Item 1)

An image capturing apparatus characterized by comprising:

a pixel portion in which a plurality of pixels are arranged;

first acquisition means for amplifying first image signals obtained by exposing the pixel portion, with multiple different gains, and acquiring multiple images respectively amplified with the multiple different gains;

second acquisition means for acquiring images for correction that correspond to the multiple different gains; and correction means for correcting the multiple images using the images for correction that correspond to the gains with which the multiple images are respectively amplified.

(Item 2)

The image capturing apparatus according to item 1, characterized in that the second acquisition means acquires the images for correction corresponding to the multiple different gains, using second image signals, which are image signals obtained without exposing the pixel portion.

(Item 3)

The image capturing apparatus according to item 2, characterized in that the first image signals and the second image signals are image signals obtained with the same exposure settings.

(Item 4)

The image capturing apparatus according to item 2 or 3, characterized in that the second image signals are image signals obtained with the pixel portion shielded from light.

(Item 5)

The image capturing apparatus according to item 2 or 3, characterized in that the second image signals are image signals obtained by repeatedly reading signals from a circuit downstream of the pixel portion without performing charge transfer from the pixel portion.

(Item 6)

The image capturing apparatus according to any one of items 2 to 5, characterized in that the second acquisition means acquires the images for correction corresponding to the multiple different gains by amplifying the second image signals with the multiple different gains.

(Item 7)

The image capturing apparatus according to any one of items 1 to 6, characterized in that the second acquisition means generates at least one of the images for correction corresponding to the multiple different gains, based on another one of the images for correction.

(Item 8)

The image capturing apparatus according to item 7, characterized in that the second acquisition means calculates the at least one image for correction from the other image for correction, based on a gain ratio of the at least one image for correction to the other image for correction.

(Item 9)

The image capturing apparatus according to item 1, characterized in that the images for correction that correspond to the multiple different gains are images stored in advance.

(Item 10)

The image capturing apparatus according to any one of items 1 to 9, characterized by further comprising determination means for determining whether or not to perform correction using the images for correction on the multiple images.

(Item 11)

The image capturing apparatus according to claim 10, characterized in that the determination means determines whether or not to perform correction using the images for correction with respect to each of the multiple images.

(Item 12)

A method for controlling an image capturing apparatus including a pixel portion in which a plurality of pixels are arranged, the method being characterized by comprising:

a first acquisition step of amplifying first image signals obtained by exposing the pixel portion, with multiple different gains, and acquiring multiple images respectively amplified with the multiple different gains;

a second acquisition step of acquiring images for correction that correspond to the multiple different gains; and a correction step of correcting the multiple images using the images for correction that correspond to the gains with which the multiple images are respectively amplified.

(Item 13)

A program for causing a computer to execute the steps of the control method according to item 12.

(Item 14)

A computer-readable storage medium in which a program for causing a computer to execute the steps of the control method according to item 12 is stored.

According to the present invention, it is possible to reduce noise in multiple images shot simultaneously, with accuracy.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capturing apparatus comprising:
- a pixel portion in which a plurality of pixels are arranged;
- at least one processor or circuit configured to function as:
- a first acquisition unit configured to amplify an image signal of pixels in a first every other rows in the pixel portion and an image signal of pixels in a second every other rows between the first every other rows obtained by a single exposure of the pixel portion, with multiple different gains, and acquiring multiple images respectively amplified with the multiple different gains;
- a second acquisition unit configured to acquire images for correction that correspond to the multiple different gains; and
- a correction unit configured to correct the multiple images using the images for correction that correspond to the gains with which the multiple images are respectively amplified.

2. The image capturing apparatus according to claim 1, wherein the second acquisition unit acquires the images for correction corresponding to the multiple different gains, using second image signals, which are image signals obtained without exposing the pixel portion.

3. The image capturing apparatus according to claim 2, wherein the first image signal and the second image signals are image signals obtained with the same exposure settings.

4. The image capturing apparatus according to claim 2, wherein the second image signals are image signals obtained with the pixel portion shielded from light.

5. The image capturing apparatus according to claim 2, wherein the second image signals are image signals obtained by repeatedly reading signals from a circuit downstream of the pixel portion without performing charge transfer from the pixel portion.

6. The image capturing apparatus according to claim 2, wherein the second acquisition unit acquires the images for correction corresponding to the multiple different gains by amplifying the second image signals with the multiple different gains.

7. The image capturing apparatus according to claim 1, wherein the second acquisition unit generates at least one of the images for correction corresponding to the multiple different gains, based on another one of the images for correction.

8. The image capturing apparatus according to claim 7, wherein the second acquisition unit calculates the at least one image for correction from the other image for correction, based on a gain ratio of the at least one image for correction to the other image for correction.

9. The image capturing apparatus according to claim 1, wherein the images for correction that correspond to the multiple different gains are images stored in advance.

10. The image capturing apparatus according to claim 1, wherein the at least one processor or circuit is configured to further function as
- a determination unit configured to determine whether or not to perform correction using the images for correction on the multiple images.

11. The image capturing apparatus according to claim 10, wherein the determination unit determines whether or not to perform correction using the images for correction with respect to each of the multiple images.

12. A method for controlling an image capturing apparatus including a pixel portion in which a plurality of pixels are arranged, the method comprising:
- amplifying an image signal of pixels in a first every other rows in the pixel portion and an image signal of pixels in a second every other rows between the first every other rows obtained by a single exposure of the pixel portion, with multiple different gains, and acquiring multiple images respectively amplified with the multiple different gains;
- acquiring images for correction that correspond to the multiple different gains; and
- correcting the multiple images using the images for correction that correspond to the gains with which the multiple images are respectively amplified.

13. A non-transitory computer readable storage medium storing a program for causing a computer to execute a method for controlling an image capturing apparatus including a pixel portion in which a plurality of pixels are arranged, the method comprising:
- amplifying an image signal of pixels in a first every other rows in the pixel portion and an image signal of pixels in a second every other rows between the first every other rows obtained by a single exposure of the pixel portion, with multiple different gains, and acquiring multiple images respectively amplified with the multiple different gains;
- acquiring images for correction that correspond to the multiple different gains; and
- correcting the multiple images using the images for correction that correspond to the gains with which the multiple images are respectively amplified.

* * * * *